Patented Feb. 22, 1927.

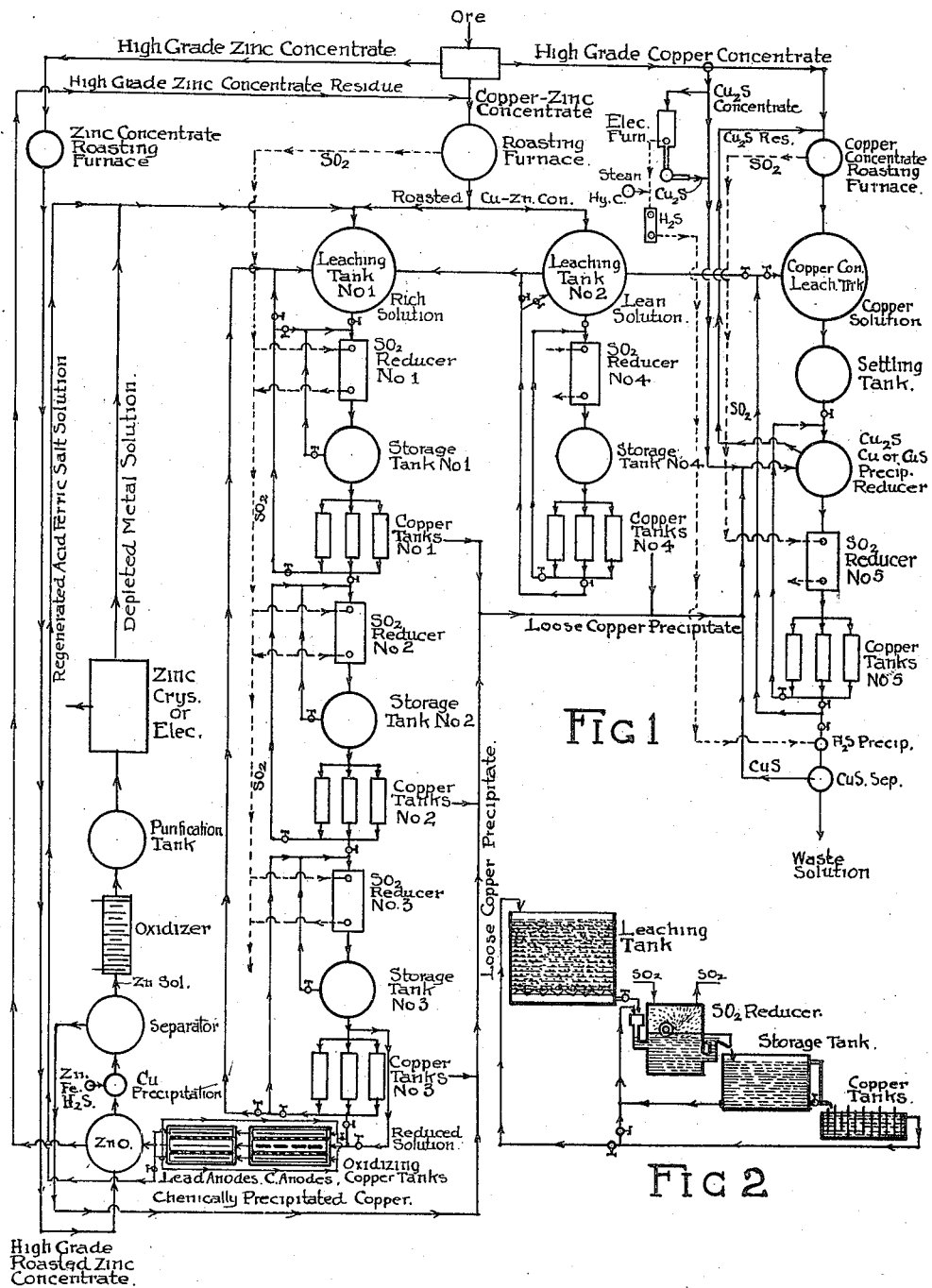

1,618,187

UNITED STATES PATENT OFFICE.

WILLIAM E. GREENAWALT, OF DENVER, COLORADO.

METALLURGICAL PROCESS.

Application filed March 9, 1926. Serial No. 93,524.

The process refers more particularly to the treatment of complex ores, especially ores containing copper and zinc, with, or without, other associated metals, such as lead, silver, and gold, by wet methods, with the objects of recovering the copper direct from the ore as the electrolytic metal, and the zinc either as the electrolytic metal or by crystallization as zinc sulphate.

This process may be considered as an improvement, or modification, of those described in my Patents, No. 1,483,056, Feb. 5, 1924; No. 1,357,495, Nov. 2, 1920; No. 1,572,115, Feb. 9, 1926, and refers more particularly to details which have proved convenient in the extraction of copper and zinc from complex ores.

The process may be best described by referring to the accompanying drawings, in which Fig. 1 represents a flow sheet in diagrammatic plan of the process, and Fig. 2 a diagrammatic longitudinal section through one electrolytic unit, in connection with a leaching tank, comprising a reducer, a storage tank, and an electrolyzer.

In describing the process it may be assumed that the ore as it comes from the mine is given the necessary preliminary treatment, such as crushing and concentration by flotation or gravity. The ore may be treated direct without concentration if desired, but this will be advisable only in exceptional cases, where the ore is not readily amenable to a preliminary treatment.

It may also be assumed that at least a small amount of high grade zinc concentrate quite free from copper and a high grade copper concentrate quite free from zinc are obtainable from the general copper-zinc concentrate from the ore. If they are not obtainable from the ore they may be provided in some other way, as from regular copper or zinc ores.

The process will be described more particularly in reference to the treatment of copper-zinc ore, and where copper and zinc occur in the resulting general concentrate. The general copper-zinc concentrate is roasted with a view of making as much as possible of the copper and zinc soluble in water and a high percentage of soluble in dilute acid solution. The fresh roasted ore may be assumed to be in leaching tank No. 1, and the partly leached ore in tank No. 2. The acid leach solution, usually including some wash water and containing copper and zinc as well as some impurities, such as iron, nickel, cobalt, aluminum, and soluble salts of the alkalies and alkaline earths, is passed from leaching tank No. 2 to leaching tank No. 1, where the solution is neutralized or nearly neutralized, and becomes heavily charged with copper and zinc. This solution will be known as the rich metal solution. This rich metal solution then flows through a series of electrolytic units, each comprising an $SO_2$ reducer, a storage tank, and an electrolyzer, where the copper is taken out of the copper-zinc solution in stages, while the zinc remains in the solution, and may be recovered after copper electrolysis.

The rich metal solution flows from the leaching tank No. 1 into the $SO_2$ reducer No. 1, where ferric iron, formed either by the roasting of the ore or by the electrolysis of the solution is reduced to the ferrous iron. From the reducer No. 1 the reduced, or, usually the partly reduced, solution flows into the storage tank No. 1, where the ferric iron is still further reduced and the solution clarified preparatory to electrolysis.

In the electrolysis of the copper solution or copper-zinc solution, containing iron, ferrous iron is not particularly harmful and may be beneficial. Ferric iron in the solution in copper electrolysis is highly detrimental. In the conversion of ferric iron to ferrous iron by means of sulphur dioxide, time and temperature are important factors. The reaction is not a rapid one, even under ordinarily favorable conditions, and to meet this condition, a large pool of the solution should be maintained with an excess amount of gas in the solution. The amount of the excess is not so important as that there should be an excess continuously. This may be done by having a large pool of the solution in the $SO_2$ reducer, or, as preferred in this case, a large pool of the solution in circuit relation with the reducer, so that a continuous flow of solution, treated and charged with sulphur dioxide, may flow from the reducer to the storage tank, or pool and a stream of solution from the storage tank, or pool, back to the reducer. In this way the large volume of solution may at all times be charged with free sulphur dioxide to act as a reducing agent for the ferric iron, and in this way the time element may be satisfactorily provided for, as also the conservation of the heat in the solution.

From the storage tank the reduced solution flows into the electrolyzers, or copper tanks No. 1, where a portion of the copper is deposited with the simultaneous regeneration of acid and ferric iron. The zinc in the solution practically remains unaffected.

The electrolyzed solution, containing ferric iron, is returned to the reducer, and the solution is circulated in a sort of closed circuit between the copper tanks, the reducer, and the storage tank, while, at the same time there is, preferably, a flow in a sort of closed circuit between the reducer and the storage tank, or pool.

Should it be desirable to increase the zinc content of the solution, a part of the solution may be returned to the ore, and the cycle repeated until the zinc content of the electrolyte or solution is built up to the desired amount.

When the solution has been sufficiently impoverished in copper in the electrolytic unit No. 1, comprising the $SO_2$ reducer No. 1, storage tank No. 1, and copper tanks No. 1, a portion of the solution is advanced to electrolytic unit No. 2, comprising the $SO_2$ reducer No. 2, the storage tank No. 2, and the copper tanks No. 2, where the cycle of reduction and electrolysis is repeated, much the same as in electrolytic unit No. 1.

When the solution has been sufficiently impoverished in copper in electrolytic unit No. 2, a portion is advanced to unit No. 3, comprising the $SO_2$ reducer No. 3, the storage tank No. 3, and the copper tanks No. 3. The portion of the solution advanced from one electrolytic unit to the next and through the system is known as the advance flow.

In the electrolysis of copper solutions, as described, it is evident that the deposition of the copper from each electrolytic unit must be done from the solution with the copper content at or near that of the advance flow from one unit to another. If a rich head solution is assumed as containing say 3.0% copper, and the solution is impoverished in electrolytic unit No. 1 to say 2.0%, with the simultaneous regeneration of acid and ferric iron, the deposition would necessarily have to be made from the solution containing about 2.0% copper. The solution flowing from unit No. 2 to unit No. 3 would have a copper content of about 1.2%, and the deposition of the copper in unit No. 2 would have to proceed on that basis. The copper content of the solution flowing from unit No. 3 would be, say, about 0.75%. If all the copper were taken out in one unit, then the deposition of the copper would necessarily have to take place at about 0.75% copper content of the solution, and such a condition would be objectionable, nor is it at all likely that a pure or regular crystalline copper deposit could be made under such conditions. It is therefore preferred to remove the copper in steps, and this also permits of better reduction, a higher efficiency, and a purer metal.

Under the conditions of reduction and electrolysis described, about 2.25 pounds of acid are regenerated per pound of copper deposited, and if the copper content of the solution is reduced from 3.0% to 0.75%, there would be regenerated about 5.6% acid, and as this acid solution contains iron and other impurities detrimental to zinc crystallization or zinc electrolysis, it becomes necessary to oxidize the iron in the solution as a preparatory step in its elimination. This is preferably done by passing the acid solution from electrolytic unit No. 3, containing, say, 0.75% copper, through diaphragm cells to deposit most of the remaining copper and oxidize, at the same time, most of the iron in the solution.

It has long been known that under certain conditions an oxidation efficiency approximating 100% can be made with carbon anodes in the conversion of ferrous iron to ferric iron; it is preferred, therefore, in stripping the solution of copper and converting ferrous iron to ferric iron, to first pass the solution through diaphragm cells, or tanks, having carbon anodes. The conditions for favorable oxidation of the iron under these conditions is a high ferrous iron content of the electrolyte, high temperature, and agitation. In this way a portion of the remaining copper may be deposited in the cathode compartment of the diaphragm cell and the iron oxidized in the anode compartment, with high anodic and cathodic efficiencies. If lead anodes are used the oxidation may approximate 50 to 60% of the theoretical, but the anodes are practically unaffected under ordinary conditions of electrolysis. It is therefore preferred to finish the deposition of the copper and the oxidation of the iron in diaphragm cells with lead anodes. In any case, the lead anodes may be used partly or entirely in stripping the solutions of copper. With lead anodes, about 1.75% iron is oxidized for each per cent of copper deposited. It is preferred to remove most of the copper from the rich metal solution from the leaching tanks in open cells, or copper tanks without diaphragms, and then electrolyze in diaphragm cells so that the remaining copper being deposited will oxidize the iron to the desired extent. In doing this, the solution is preferably flowed from the open cells, containing a low percentage of ferric iron, through the reducer, where the ferric iron is reduced, and then through the cathode compartment of the diaphragm cells, and the impoverished copper solutions after having passed through the cathode compartments of the diaphragm cells, is passed through the anode compartments, where the iron is oxidized to the ferric condition.

The solution as it finally issues from the diaphragm cells is very low in copper and contains the iron mostly or entirely in the ferric condition, and contains from five to six per cent acid as a result of the copper deposition and reduction of the ferric iron, in the copper electrolysis. In neutralizing this regenerated acid solution resulting from the copper deposition, preparatory to zinc crystallization or zinc electrolysis to recover the zinc, it is preferred to use a very high grade roasted zinc concentrate, or a crude zinc oxide. For this purpose a relatively small amount of very high grade zinc concentrate is made from the zinc ore or from the general zinc-copper concentrate, containing little or no copper and as small a percentage as possible of soluble iron. If such a concentrate cannot be obtained from the general ore, it may be obtained from other mines.

The electrolyzed copper solution is then treated with this roasted zinc concentrate, with the general result that zinc goes into solution for the equivalent of free acid, and the iron is precipitated. The neutral, or nearly neutral solution, now containing zinc to saturation or nearly to saturation, is purified and treated to recover the zinc, either by crystallization, by electrolysis, or otherwise, as is well known. The roasted zinc concentrate residue containing the precipitated iron and precipitated residual copper from the copper solution, is re-roasted to make the iron insoluble and put the residue in condition to make a further recovery of the zinc and residual copper therefrom.

Any small amount of copper in the neutralized solution, may be eliminated from the zinc solution by chemical precipitation, with precipitants such as metallic zinc or hydrogen sulphide, and this chemically precipitated copper may be re-dissolved and re-deposited as the pure electrolytic metal, in a relatively pure copper solution.

In the recovery of the zinc, either by crystallization or by electrolysis, it is desirable to have as nearly a zinc saturated solution as practical, because the purification of the solution for zinc recovery is expensive, and better efficiencies are possible with rich zinc solution than with lean zinc solutions. The zinc added to the solution in neutralizing the acid regenerated in the copper deposition, is a great advantage, and the rich metal solutions from the leaching tank may vary considerably in their metal content for zinc recovery, while still making it practical to get a saturated or nearly saturated zinc solution after copper electrolysis.

If the rich metal solution as first coming from the leaching tank does not contain the desired metal content, it may be enriched either by returning the partly impoverished solution from the first electrolytic unit to the leaching tank, or by returning part of the advance flow of solution from the last, or third, electrolytic unit.

In the treatment of complex ores containing copper and zinc, it is usually practical to separate a high grade copper concentrate, containing little or no zinc, from the ore or from the general copper-zinc concentrate. Where this is possible it is better to treat this high grade copper concentrate separately than to mix the copper with the copper zinc concentrate, and then recover the copper from the copper-zinc solutions. It is preferred to produce a high grade copper concentrate and recover the copper therefrom by a separate copper electrolytic system or circuit, and use the copper solution to refine, or to re-dissolve and re-deposit the impure or the loose copper deposited in the copper-zinc electrolytic circuit.

In the production of the copper concentrate, all may be made of one grade, roasted, leached, and the solution electrolyzed to produce the electrolytic metal. It is preferred, however, to still further separate a relatively purer concentrate, especially if the ore contains any of the copper as chalcocite, $Cu_2S$, from which the copper can readily be dissolved without roasting, by the ferric iron produced by depositing the copper from the solution obtained from leaching the roasted copper ore or concentrate. This step performs a double function; copper is dissolved from the $Cu_2S$ concentrate while at the same time the ferric iron is reduced to the ferrous condition, and this permits of a higher efficiency in the copper deposition, a better deposit, and smoother operation.

The electrolytic copper circuit may conveniently comprise a leaching tank for the roasted concentrate, a reducing tank containing $Cu_2S$, CuS, or Cu, or all at the same time, and will be referred to as the CuS reducer, an $SO_2$ reducer, and the electrolytic copper tanks. The $Cu_2S$ may be obtained as a high grade concentrate or by partial smelting, the CuS may be obtained as a precipitate in treating lean and foul copper solution with hydrogen sulphide, and the Cu may be obtained as a loose or impure deposit in the zinc-copper circuit. It is preferred to pass the solution through the CuS reducer before passing it through the $SO_2$ reducer.

In treating the roasted copper concentrate, it is leached, and the resulting copper solution is electrolyzed to deposit the copper and regenerate acid and ferric iron. The solution issuing from the copper tanks No. 5 and containing, say, 0.25% ferric iron, is returned to the CuS reducer, where the ferric iron is reduced while an equivalent of copper goes into solution. If further reduction is desired, or if it is desired to electrolyze in the presence of a small amount of $SO_2$ which at times is beneficial, even after previous reduction of the ferric iron, the solution may be passed through the $SO_2$ reducer No. 5, in flowing from the CuS reducer to the copper tanks No. 5. A portion of the solution is returned to the leaching tank, where more copper is brought into solution, and the cycle is repeated until the copper in the roasted concentrate is sufficiently extracted.

If the copper concentrate contains the copper largely associated with iron, as in chalcopyrite or bornite, it may be desirable to eliminate some or all of the iron before applying the copper sulphide to the CuS reducer. On account of the high grade of this copper concentrate, this can conveniently be done in an electric furnace, where the iron may be slagged off and a high grade copper sulphide obtained. In applying this high grade copper sulphide to the electrolyte it is preferred to subdivide it, either by granulation or as shots or shreds, and this may be done by bringing a small stream of the molten copper sulphide from the electric furnace in contact with a stream of water or a stream of compressed air. The resulting subdivided copper sulphide is transferred to the CuS reducer, where it acts effectively in reducing the ferric iron formed by the electrolysis. By subdividing the copper sulphide as described, a large surface area of the sulphide is exposed to the action of the solution, and there will be no serious difficulty either of percolation or of agitation in applying the copper sulphide to the solution in the CuS reducer. The resulting residue from the copper sulphide, containing some iron, sulphur, as well as some undissolved copper, is transferred to the copper concentrate roasting furnace, where the sulphur is eliminated, the iron made insoluble by oxidation, and the remaining copper oxidized so as to make it readily soluble in dilute acid solution.

If the impure copper solution of the electrolytic copper circuit does not contain too much iron and other impurities, and if it contains considerable zinc, the excess or foul solution may be transferred to the copper-zinc circuit, so as to keep the electrolytic copper circuit at a standard of purity for the deposition of the copper of the desired purity. The transferred acid solution from the copper circuit will act on the copper and zinc in leaching the copper-zinc ore or concentrate of the copper-zinc circuit, and the copper and zinc are recovered as already described. If, however, the solution rejected from the electrolytic copper circuit is too impure or too large in amount to add to the copper-zinc circuit, the copper is precipitated from the waste foul solution, preferably with hydrogen sulphide, and the solution run to waste.

The hydrogen sulphide is preferably produced by combining hydrogen, either as such, or as steam, with the sulphur vapor from the electric furnace. The sulphur vapor is brought in contact with hydrogen or a hydrogen containing fluid in an $H_2S$ generator, which may conveniently consist of a chamber containing a reducing or a catalytic agent, such as coke, glass, pumice, and maintained at a temperature of from 400 to 500 deg. C. In the production of hydrogen sulphide in this way, a hydrocarbon, preferably in the form of oil, may be used with or without steam, and forms a convenient way of supplying hydrogen or a hydrogen containing fluid and maintaining the reducing atmosphere desired for good operating conditions in the $H_2S$ generator. The $H_2S$ may be used for the purpose described, or for the precipitation of copper, arsenic, antimony, etc., in the purification of the copper-zinc solution, preparatory to the recovery of the zinc.

In the electrolysis of the leach solutions it is desirable to obtain a solution heavily charged with copper and zinc and containing only a small amount of acid. This is done by applying the solution to the fresh ore in leaching tank No. 1. After the first rich solution has been taken off and the ore partly leached, it is desirable to still further leach the ore or concentrate to make a fairly close recovery of the metals from the ore. This is the condition which is presumed to exist in leaching tank No. 2, and the partly leached ore or concentrate is then leached with a dilute acid solution by means of which both the copper and the zinc are fairly closely extracted from the ore. The copper-zinc solution from leaching tank No. 2 passes to the $SO_2$ reducer No. 4, and through the storage tank No. 4, and then to the copper tanks No. 4, and the cycle of leaching, reduction, and electrolysis is repeated until the copper and the zinc are sufficiently extracted from the ore. In this cycle of operation the copper is all the while being deposited, while the zinc accumulates in the solution in the acid treatment, or in electrolytic circuit No. 4, and when the zinc has accumulated in the solution to the desired extent, the solution is transferred to leaching tank No. 1, where it is heavily charged with zinc and then becomes the rich metal solution for the recovery of the copper and the zinc, as described.

It is desirable to precipitate the copper out of the leach solution in the electrolytic copper tanks No. 3 as closely as practical. A portion of the solution flowing from the copper tanks No. 3, containing ferric iron, is returned to the ore to pass through another complete cycle of solution, reduction, and electrolysis. Another portion of the solution issuing from the copper tanks No. 3, containing ferric iron, is passed through the anode compartment of a diaphragm cell to still further oxidize ferrous iron to the ferric condition. This solution, high in ferric iron and low in ferrous iron, is in excellent condition for the elimination of the iron from the solution with the roasted high grade zinc concentrate or other precipitation agent. If a higher ferric iron solution is desired for the extraction of copper from the ore, as in copper ore containing chalcocite, than that obtained from the last open cells, or copper tanks No. 3, the high ferric iron solution from the anode compartment of the diaphragm cell may be used for that purpose, either wholly or partly.

In the deposition of the copper in the series of copper depositing tanks, it is preferred to first electrolyze the solution in open or non-diaphragm cells under reduced conditions of the iron, as in copper tanks No. 1 and No. 2, and then, as in unit No. 3, electrolyze the copper solution in open tanks or cells to allow the outflowing solution to contain as much ferric iron as practical, and then pass the solution, low in copper and relatively high in acid and ferric iron, through the anode compartment of the diaphragm cell. If the solution is not sufficiently impoverished in copper as it issues from the last or open copper tanks No. 3, a portion may be returned to the $SO_2$ reducer No. 3. In this way the iron can be effectively and economically oxidized preparatory to its removal in the purification of the solution for the recovery of the zinc or other remaining metals. The small amount of copper remaining in the electrolyzed and oxidized solution will be largely removed with the iron, and this small remaining copper, precipitated with the iron, can be subsequently recovered by re-roasting the roasted zinc concentrate residue to make the precipitated iron insoluble in dilute acid, while the copper and zinc will remain soluble or be made soluble by re-roasting.

If it is desired to eliminate excess iron in the copper solution to reuse the solution, the oxidized solution issuing from the diaphragm cells may be treated with copper oxide or roasted high grade copper concentrate, which acts to precipitate the iron out of the solution much the same as zinc oxide or roasted high grade zinc concentrate. By roasting the copper oxide residue the precipitated iron is made insoluble and the residual copper may be leached from the insoluble iron.

It is desirable in some instances to precipitate some of the metals, such as silver, arsenic, and antimony out of the solution before electrolyzing the solution to deposit the copper. This may be done by treating the neutral or nearly neutral solution, preferably after $SO_2$ reduction, with some of the loosely deposited granular or sponge copper obtained in the electrodeposition of the copper, or otherwise, which can be effectively used for this purpose. When the copper becomes too impure with precipitated metal for effective use, it is withdrawn from the tank, and the copper separated from the precipitate. The cleaned copper is then returned to the tank for further use. The separation of the copper and precipitate can be effected by passing the material over a concentrating table whereby the lighter precipitate is washed away from the heavier copper.

Copper can be deposited in hard or reguline form of high purity from a solution high in iron. When, however, the solution contains large quantities of zinc and possibly other impurities than iron, it is difficult and apparently impractical to get a reguline and pure deposit. In such cases it is preferred to let the loosely deposited copper drop to the bottom of the tanks, and when enough copper has accumulated, washing it out and transferring it to another electrolytic circuit, No. 5, comprising a $CuS$, $Cu_2S$, or $Cu$ reducer, and $SO_2$ reducer No. 5, and the copper tanks No. 5, using a relatively pure acid solution containing salts of iron as the electrolyte. In this way the copper may be re-dissolved, and re-deposited as the relatively pure electrolytic metal. As the solution in circuit No. 5 becomes impure for the purpose intended, it is transferred to the regular leaching and electrolytic circuit.

The process has been described more particularly in reference to sulphate solutions; it is evident that it is applicable to chloride solution.

I claim:

1. A process of treating copper ore comprising, leaching the ore with a dilute acid solution, electrolyzing the resulting copper solution containing salts of iron to deposit the copper and regenerate acid and ferric iron in an electrolytic unit comprising a reducer, a storage tank and an electrolyzer, circulating a portion of the solution in a circuit between the reducer and the storage tank, and advancing another portion to the electrolyzer.

2. A process of treating copper ore comprising, leaching the ore with a dilute acid solution to extract the copper, electrolyzing the resulting copper solution containing salts of iron to deposit the copper and regenerate acid and ferric iron in an electrolytic unit comprising a reducer, a storage tank and an electrolyzer, circulating a portion of the solution in a circuit between the reducer and the storage tank, and circulating another portion in a circuit between the storage tank, the electrolyzer and the reducer.

3. A process of treating copper ore comprising, leaching the ore with a dilute acid solution to extract the copper, electrolyzing the resulting copper solution containing salts of iron to deposit the copper and regenerate acid and ferric iron in an electrolytic unit comprising a reducer, a storage tank and an electrolyzer, circulating a portion of the solution in a circuit between the reducer and the storage tank, circulating another portion between the storage tank, the electrolyzer and the reducer, and circulating another portion between the leaching tank and the electrolytic unit.

4. A process of treating copper ore comprising, leaching the ore with a dilute acid solution to extract the copper, electrolyzing the resulting copper solution containing salts of iron to deposit the copper and regenerate acid and ferric iron in an electrolytic unit comprising a reducer, a storage tank and an electrolyzer, circulating a portion of the solution in a circuit between the reducer and the storage tank, circulating a portion of the solution between the storage tank, the electrolyzer and the reducer, circulating another portion between the leaching tank and the electrolytic unit, and advancing a portion to another electrolytic unit comprising a reducer, a storage tank and an electrolyzer.

5. A process of treating copper ore comprising, leaching the ore with a dilute acid solution to extract the copper, electrolyzing the resulting copper solution containing salts of iron to deposit the copper and regenerate acid and ferric iron in an electrolytic unit comprising a reducer, a storage tank and an electrolyzer, circulating a portion of the solution in a circuit between the reducer and the storage tank, circulating a portion of the solution between the storage tank, the electrolyzer and the reducer, and advancing a portion of the solution to another electrolytic unit comprising a reducer, a storage tank and an electrolyzer and repeating the cycle.

6. A process of treating copper ore comprising, leaching the ore with a dilute acid solution, alternately subjecting the resulting copper solution containing salts of iron to reduction and to electrolysis in open or non-diaphragm cells to deposit a portion of the copper and regenerate acid, then when the desired portion of the copper has been removed from the solution by electrolysis in the open or non-diaphragm cells reducing the solution and passing the reduced solution through the cathode compartment of a diaphragm cell to deposit another portion of the copper.

7. A process of treating copper ore comprising, leaching the ore with a dilute acid solution, alternately subjecting the resulting copper solution containing salts of iron to reduction and to electrolysis in open or non-diaphragm cells to deposit a portion of the copper and regenerate acid, then when the desired portion of the copper has been removed from the solution by electrolysis in the open cells reducing the solution and passing the reduced solution through the cathode compartment of a diaphragm cell to deposit another portion of the copper, and then passing the resulting impoverished or depleted copper solution through the anode compartment of the diaphragm cell to oxidize ferrous iron in the solution to the ferric condition.

8. A process of treating copper ore comprising, leaching the ore with a dilute acid solution, alternately subjecting the resulting copper solution containing salts of iron to reduction and to electrolysis in open or non-diaphragm cells to deposit a portion of the copper and regenerate acid, then when the desired portion of the copper has been removed from the solution by electrolysis in open cells reducing the solution and electrolyzing the solution in diaphragm cells with carbon anodes to deposit another portion of the copper and oxidize ferrous iron to the ferric condition.

9. A process of treating copper ore comprising, leaching the ore with a dilute acid solution, alternately subjecting the resulting copper solution containing salts of iron to reduction and to electrolysis in open or non-diaphragm cells to deposit a portion of the copper and regenerate acid, then when the desired portion of the copper has been removed from the solution by electrolysis in open cells reducing the solution and electrolyzing the solution first in diaphragm cells containing carbon anodes and then in diaphragm cells containing lead or other metal anodes.

10. A process of treating copper ore comprising, leaching the ore with a dilute acid solution, alternately subjecting the resulting copper solution containing salts of iron to reduction and to electrolysis in open or non-diaphragm cells to deposit a portion of the copper and regenerate acid and ferric iron, then passing the solution through the anode compartment of a diaphragm cell to oxidize ferrous iron to ferric iron.

11. A process of treating copper ore comprising, leaching the ore with a dilute acid solution, electrolyzing the resulting copper solution containing salts of iron to deposit copper and regenerate acid in open or non-diaphragm cells, then when the solution has been sufficiently impoverished in copper and regenerated in acid and ferric iron passing the solution through the anode compartment of a diaphragm cell to increase the ferric iron content of the solution, and returning the solution to the ore.

12. A process of treating copper ore containing zinc comprising, leaching the ore with a dilute acid solution to extract the copper and the zinc, subjecting the resulting copper-zinc solution containing salts of iron to the reducing action of sulphur dioxide and to electrolysis to deposit a portion of the copper and regenerate acid, neutralizing the acid produced by the reduction and copper deposition with a roasted zinc concentrate containing no copper or only a relatively small amount of copper, then purifying the solution and treating the purified solution to recover the zinc.

13. A process of treating copper ore containing zinc comprising, leaching the ore with a dilute acid solution to extract copper and zinc, alternately subjecting the resulting copper-zinc solution containing salts of iron to reduction and to electrolysis to deposit a portion of the copper and regenerate acid, then electrolyzing the solution to convert ferrous iron to ferric iron, then applying a high grade roasted zinc concentrate to the electrolyzed and oxidized solution to neutralize the acid formed by the deposition of the copper and to enrich the solution in zinc, and then recovering the zinc from the resulting enriched zinc solution.

14. A process of treating copper ore containing zinc comprising, leaching the ore with a dilute acid solution to extract copper and zinc, alternately subjecting the resulting copper-zinc solution containing salts of iron to reduction and to electrolysis to deposit a portion of the copper and regenerate acid, then electrolyzing the solution to convert more ferrous iron to ferric iron, treating the resulting electrolyzed and oxidized solution with a high grade oxidized zinc concentrate to neutralize the acid formed by the deposition of the copper and to precipitate copper and iron from the solution into the zinc concentrate and to enrich the solution in zinc, recovering the zinc from the resulting enriched zinc solution, roasting the high grade zinc concentrate residue containing precipitated copper and iron to make the iron insoluble, and then leaching the roasted high grade zinc concentrate residue to extract the remaining zinc and the contained copper.

15. A process of treating copper ore comprising, leaching the ore with a solvent for the copper, alternately subjecting the resulting copper solution containing salts of iron to the action of electrolysis in open cells and to the action of a reducing agent to deposit a portion of the copper, then subjecting the copper solution to electrolysis in open cells to deposit another portion of the copper with the simultaneous regeneration and accumulation of ferric iron, and then passing the solution through the anode compartment of a diaphragm cell to still further oxidize ferrous iron to ferric iron.

16. A process of treating copper ore comprising, leaching the ore with a solvent for the copper, reducing and electrolyzing the resulting copper solution containing salts of iron in open or non-diaphragm cells to deposit a portion of the copper and regenerate acid and ferric iron, and then passing the solution through the anode compartment of a diaphragm cell to still further oxidize ferrous iron to ferric iron.

17. A process of treating copper ore comprising, leaching the ore with a solvent for the copper, reducing the resulting copper solution containing salts of iron and electrolyzing it in open cells to deposit a portion of the copper and regenerate acid and ferric iron, then passing the solution through the anode compartment of a diaphragm cell to still further oxidize ferrous iron to the ferric condition, and then returning the solution of a portion thereof to the ore to pass through another cycle.

18. A process of treating copper ore containing other metals comprising, leaching the ore with a solvent for the copper, reducing the resulting copper solution containing salts of iron with sulphur dioxide, reducing the acidity of the solution, then applying finely divided copper to the solution to precipitate some of the metallic impurities, and then electrolyzing the copper solution to deposit the copper.

19. A process of treating copper ore containing other metals comprising, leaching the ore with a solvent for the copper, electrolytically percipitating the copper in non-adherent or loose form on suitable cathodes, transferring the impure non-adherent copper to another electrolytic circuit with a relatively pure iron salt solution containing ferric iron as the electrolyte, re-dissolving the transferred loose or non-adherent copper in the ferric salt solution with the reduction of the ferric iron to the ferrous condition, and then electrolyzing the resulting copper solution to deposit the copper as the relatively pure electrolytic metal with the simultaneous regeneration of ferric iron and repeating the cycle.

20. A process of treating copper ore comprising, leaching the ore with a solvent for the copper, reducing the resulting copper solution containing salts of iron and electrolyzing it in open or nondiaphragm cells to deposit a portion of the copper and regenerate acid and ferric iron, returning a portion of the electrolyzed solution to the ore, and passing another portion through the anode compartment of a diaphragm cell to still further oxidize ferrous iron to the ferric condition.

21. A process of treating ores of metals comprising, leaching the ore with a solvent for the metals, electrolyzing the resulting metal solution containing metals of variable valencies to deposit the metals and raise the valency of the variable valent metals remaining in the solution in an electrolytic unit comprising a reducer, a storage tank and an electrolyzer, circulating a portion of the solution in a circuit between the reducer and the storage tank, and advancing another portion to the electrolyzer.

22. A process of treating ores of metals comprising, leaching the ore with a solvent for the metals, electrolyzing the resulting metal solution containing metals of variable valencies to deposit the metals and raise the valency of the variable valent metals remaining in the solution in an electrolytic unit comprising a reducer, a storage tank and an electrolyzer, circulating a portion of the solution in a closed circuit between the reducer and the storage tank, and circulating another portion in a circuit between the storage tank, the electrolyzer and the reducer.

23. A process of treating ores of metals comprising, leaching the ore with a solvent for the metals, applying sulphur dioxide to the resulting metal solution in a sulphur dioxide reducer, passing the solution from the reducer into a storage tank containing a pool of the solution, flowing the solution from the pool into electrolyzers to deposit a portion of the metal, circulating a portion of the solution between the reducer and the pool, and circulating another portion between the pool, the electrolyzer and the sulphur dioxide reducer.

24. A process of treating copper ore containing other metals comprising, leaching the ore with a solvent for the copper, neutralizing the solution, applying finely divided metallic copper to the solution to precipitate some of the undesirable metallic impurities, then electrolyzing the copper solution to deposit the copper, and when the finely divided copper becomes fouled with precipitated impurities washing the precipitated impurities from the finely divided copper and again applying the finely divided copper to the leach copper solution.

25. A process of treating copper ore comprising, leaching the ore with a solvent for the copper, electrolyzing the resulting copper solution containing impurities to deposit the copper, transferring the loosely deposited copper to a separate refining circuit with a relatively pure electrolyte containing salts of iron and re-dissolving and re-depositing the copper as the relatively pure electrolytic metal, and when the solution in the refining circuit becomes too impure for the deposition of relatively pure copper in the refining circuit transferring the impure solution to the regular leaching and electrolytic circuit.

26. A process of treating copper ore containing zinc comprising, concentrating the ore to produce a copper-zinc concentrate relatively high in copper and low in zinc and a zinc-copper concentrate relatively high in zinc and low in copper, roasting and leaching the zinc-copper concentrate to extract the zinc and the copper, precipitating the copper from the resulting zinc-copper solution and treating the solution to recover the zinc, roasting and leaching the copper-zinc concentrate to extract the copper and the zinc, electrolyzing the resulting copper-zinc solution containing salts of iron to deposit the copper and regenerate acid and ferric iron, and transferring the precipitated copper from the zinc-copper leaching circuit to the copper-zinc leaching and electrolytic circuit.

27. A process of treating copper ore containing zinc comprising, concentrating the ore to produce a copper-zinc concentrate relatively high in copper and low in zinc and a zinc-copper concentrate relatively high in zinc and low in copper, roasting and leaching the zinc-copper concentrate to extract the zinc and the copper, precipitating the copper from the resulting zinc-copper solution and treating the solution to recover the zinc, roasting and leaching the copper-zinc concentrate to extract the copper and the zinc, electrolyzing the resulting copper-zinc solution containing salts of iron to deposit the copper and regenerate acid and ferric iron, transferring the precipitated copper from the zinc-copper leaching circuit to the copper-zinc leaching and electrolytic circuit, and transferring a portion of the copper-zinc solution from the copper-zinc leaching and electrolytic circuit to the zinc-copper leaching circuit.

28. A process of treating copper ore containing zinc comprising, leaching the ore with an acid solution to extract the copper and zinc, alternately subjecting the resulting copper-zinc solution to the action of electrolysis and to the action of a reducing agent for ferric iron to deposit the copper and regenerate acid, applying a high grade roasted zinc concentrate to the electrolyzed solution to neutralize the acid formed by the deposition of the copper and to enrich the solution in zinc, and then recovering the zinc from the enriched zinc solution.

29. A process of treating copper ore comprising, leaching the ore with an acid solution to extract the copper, electrolyzing the resulting copper solution to obtain a portion of the copper as the relatively pure electrolytic metal, then electrolyzing the solution to obtain another portion of the copper as the relatively impure metal, transferring the copper deposited as the relatively impure metal to a refining circuit separate and distinct from the leaching and electrolytic circuit from which the impure copper was deposited, said refining circuit having an electrolyte containing ferric iron to re-dissolve the impure copper, and then re-depositing the re-dissolved copper as the relatively pure electrolytic metal with the simultaneous regeneration of ferric iron, and then re-dissolving more copper from the impure copper with the ferric iron so produced and repeating the cycle.

30. A process of treating copper ore comprising, leaching the ore with a suitable solvent to extract the copper, precipitating the copper from the resulting copper solution as an impure copper precipitate, transferring the impure copper precipitate to a refining circuit separate and distinct from the leaching circuit from which the impure copper precipitate was obtained, said refining circuit having an electrolyte containing ferric iron to re-dissolve the copper of the impure precipitate, electrolytically depositing the re-dissolved copper as the relatively pure electrolytic metal with the simultaneous regeneration of ferric iron, and then re-dissolving more copper from the impure copper precipitate with the ferric iron so produced and repeating the cycle.

WILLIAM E. GREENAWALT.